(No Model.) 2 Sheets—Sheet 1.
W. E. AYRTON & J. PERRY.
HEAT MEASURING DEVICE.
No. 492,602. Patented Feb. 28, 1893.
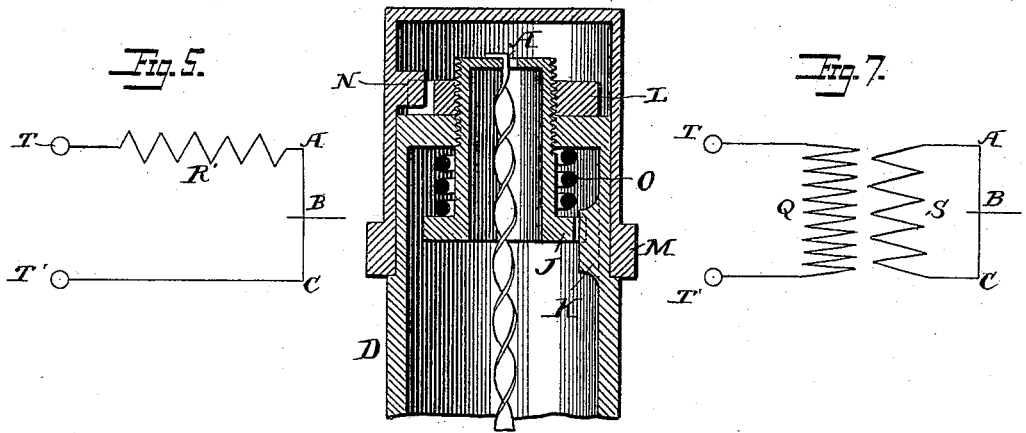
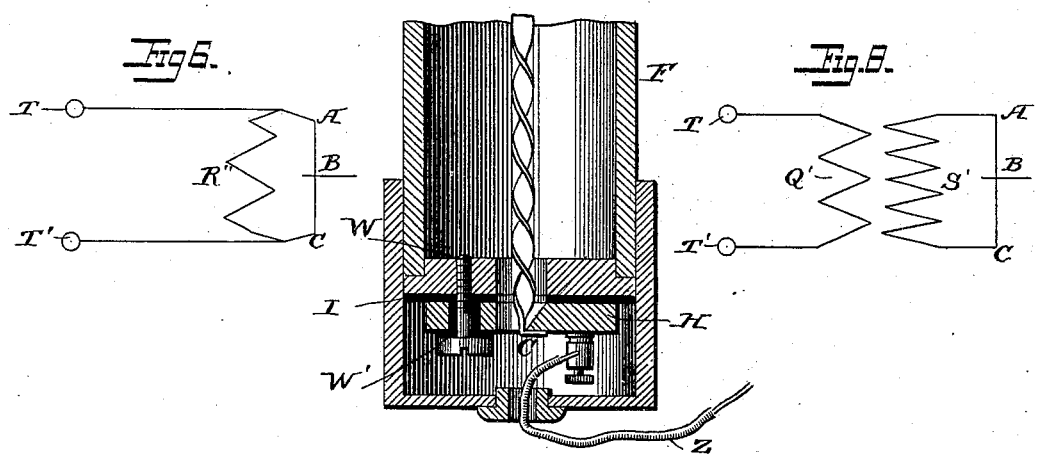
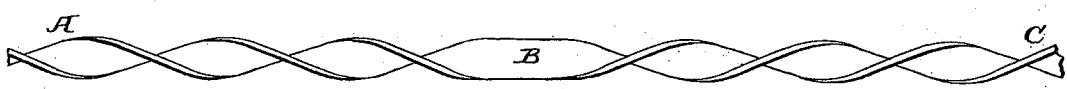
Witnesses
Jno. G. Hinkel
J. A. Fairgrieve
Inventors
William E. Ayrton
John Perry
By Tasker Freeman
Attorneys (No Model.) 2 Sheets—Sheet 2.
W. E. AYRTON & J. PERRY.
HEAT MEASURING DEVICE.
No. 492,602. Patented Feb. 28, 1893.
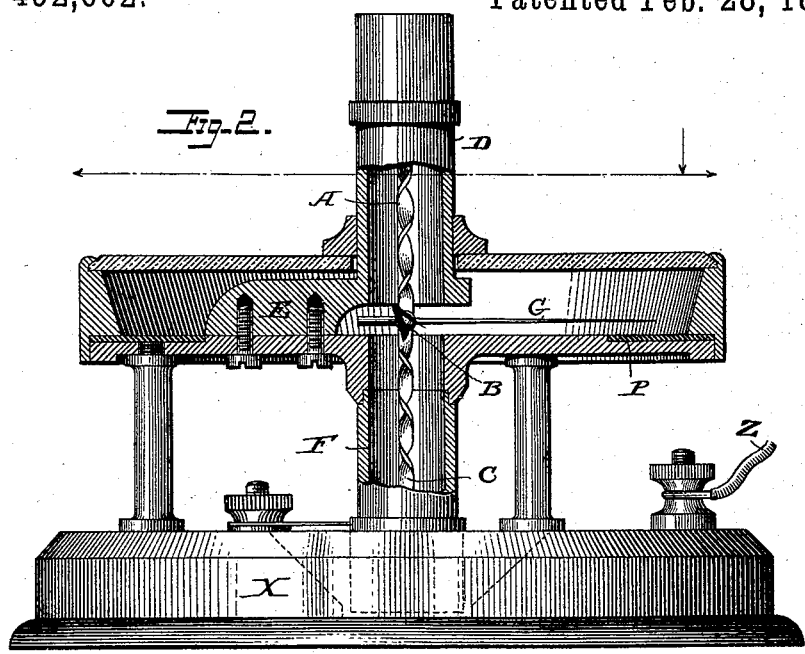
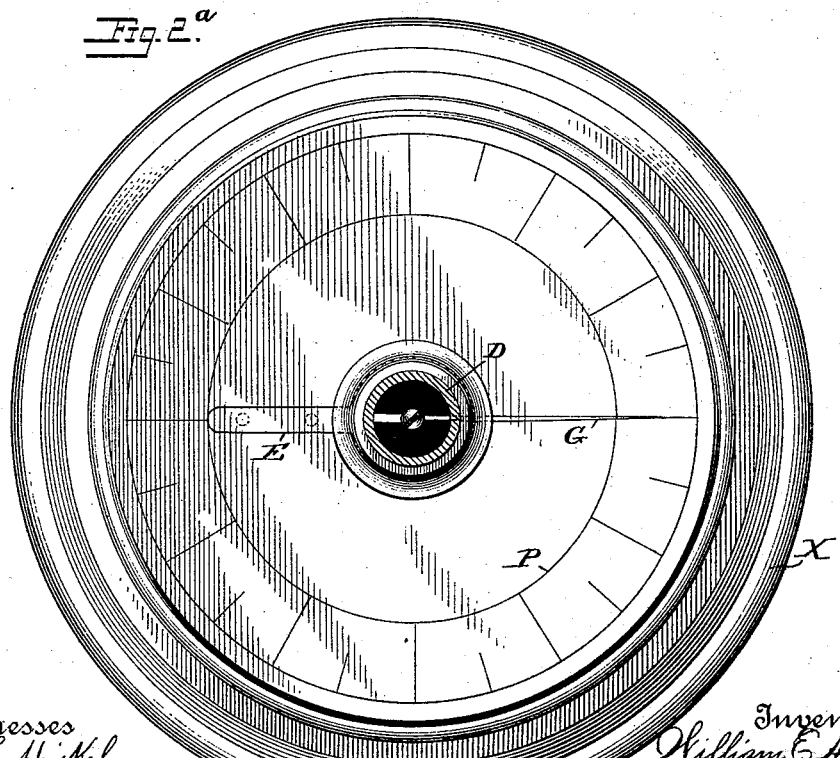

UNITED STATES PATENT OFFICE.

WILLIAM EDWARD AYRTON AND JOHN PERRY, OF LONDON, ENGLAND; SAID AYRTON ASSIGNOR TO CHARLES EDWARD HOLLAND, OF SAME PLACE.

HEAT-MEASURING DEVICE.

SPECIFICATION forming part of Letters Patent No. 492,602, dated February 28, 1893.

Application filed March 7, 1892. Serial No. 424,044. (No model.) Patented in England February 22, 1889, No. 3,213.

*To all whom it may concern:*

Be it known that we, WILLIAM EDWARD AYRTON and JOHN PERRY, subjects of the Queen of England, residing at London, in England, have invented certain new, useful, and Improved Heat-Measuring Devices, of which the following is a specification, and for which we have received Letters Patent of Great Britain, No. 3,213, dated February 22, 1889.

Our invention relates to improvements in apparatus for measuring temperature and indicating, measuring, or regulating electric currents, in which the heating of the conductor by an electric current causes motion to be given to a pointer or regulator; and our invention consists of a strip of metal or other elastic material to which a permanent twist has been given, put in a permanent state of tension, and fixed at its ends in such a way that it cannot alter in length; any alteration in temperature causes a pointer suitably placed on the strip to rotate and this rotation is what we employ for the purpose of measurement or regulation. We attain these objects by the mechanism illustrated in the accompanying drawings, in which Figure 1, is a plan view of the twisted strip. Fig. 2, is an elevation, partly in section, of an instrument embodying our invention. Fig. 2ª, is a plan view of the same. Fig. 3, is an enlarged vertical section showing the manner of fastening one end of the strip. Fig. 4, is a sectional view, showing the manner of fastening the other end of the strip. Figs. 5, 6, 7 and 8, are diagrammatic illustrations, showing various applications of the invention, especially in connection with electrical circuits.

Similar letters refer to similar parts throughout the drawings.

In Fig. 1, A B C is a metallic strip whose cross section is such that two dimensions at right angles to one another are very different, either a very narrow rectangle or elongated ellipse for example, to one part B C a right handed twist has been given, and to the other part B A a left handed. If a pointer be fixed at the neutral point B, and one of the ends gets an axial motion of translation only, turning being prevented there, the pointer turns round. When such a strip is fixed at its ends and put in tension, if it is prevented from altering in length the pointer rotates when the temperature of the strip alters. In this form we use it as a thermometer or if the alteration of temperature is due to passing a current of electricity through the strip it may be called an electric current measurer and may be used in ammeters or voltmeters or for many kinds of regulation in electrical appliances where the alteration of a current is employed to produce the regulation.

When a straight strip is taken, one end fixed and the other end twisted so that the twist is in the same direction throughout and the second end is then fixed in this position, then whether much or only a little permanent set exists, when a portion of this strip alters in temperature and not the other, we find that more of the twist comes into the portion that is at the higher temperature, and a pointer at the neutral point may be used to indicate the effect. Thus if an electric current is allowed to heat only a portion of such a strip we have a means of measuring the current.

In carrying out our invention it must be remembered that the behavior of the strip is due to its change of temperature and also to the change of temperature of the case. If the mere rise in temperature of the strip itself is to be measured the strip must be kept of constant length or as nearly constant length as possible. If the difference of temperature between the strip and its case is to be measured, and this is what we have to deal with in the above mentioned ammeters voltmeters and other electrical appliances, then the axial co-efficient of expansion of the case must be made as nearly as possible the same as that of the strip.

Figs. 2, 3 and 4 show an electrical measuring instrument. A B C is a right and left handed or in other words a double twisted strip of platinum silver such as shown in Fig. 1 fastened at the ends A and C to the ends of a frame or case D F the part D of which is made of brass and F of iron. The case is preferably tubular but allows the pointer G fixed to the strip at B to rotate through nearly four right angles, so that the part E of the case is a thin but rigid bracket connecting the two tubular parts. The tubular portion of the case is about two thirds of brass in its axial length and one third of iron, so as to compensate for changes of temperature of the case, so that there may be no rotation of the pointer if the case and strip are altered equally in temperature. Or if the strip be made of steel the whole of the tubular case may be of steel, and if the strip be of some other material the case must be made so that its co-efficient of expansion axially is the same as that of the strip, as previously mentioned. One end C of the strip is fixed to the metallic block H (Fig. 4) which is insulated from the case by the insulating washer I. The piece H is fixed by means of two or more screws passing through insulating collets W' one such screw W being shown in the figure. The other end A is fixed to the screw piece J (Fig. 3) which is prevented from turning by the projection K on the inside of the case but can be moved in a direction parallel to its axis by turning the nut L. The cap M covers this and has a piece N projecting into a slot in the nut so that by turning the cap the nut is also turned without the necessity of removing the cap. In order to keep the piece J quite firm the spring O is put in as shown. In this form current enters the instrument at one terminal, which is connected by a wire Z to the block H and passes from it into the strip at C through the strip to A and so to the case of the instrument, which is connected by a second wire to the second terminal. When necessary, however, the end A of the strip may be fixed to a block insulated from the piece J just as the block H is insulated from the case, and the current would then pass from this block to a second wire.

The whole instrument is mounted by three legs on the insulating base X.

We find that when a definite difference of potentials is maintained between the ends of the strip, the pointer points to a definite point of the scale P below it so that this scale may be graduated in volts. Or if preferred in ampères.

When using the instrument as a voltmeter we sometimes use resistances in series with the strip itself as shown in Fig. 5, R' being the extra resistance and A B C the strip. These resistances should preferably be of the same material as the strip. In Figs. 5, 6, 7, 8, T and T' represent the terminals.

When using the instrument as an ammeter we sometimes pass current not only through the strip, but also through a conductor placed parallel with the strip (as shown in Fig. 6) so that part of the whole current passes through the strip A B C and the remainder through the second conductor R''.

For alternating currents we use the instrument in combination with a small transformer. By suitably winding the transformer we make the instrument measure either currents or potential differences of any amount. When the amount of iron in the transformer is rightly proportioned we find that a large difference in the number of alternations per second makes no difference to the reading of the instrument for the same current or same difference of potentials. The arrangement is shown in Figs. 7 and 8—Fig. 7 shows the voltmeter, in which the terminals of the instrument are joined to the ends of the fine coil Q of the transformer, and the ends of the strip to the ends of the thick coil S. For ammeters (Fig. 8) the terminals of the instrument are joined to a coil Q' of the transformer consisting of only a few turns of thick wire and the ends of the strip to the ends of the second coil S', which is similar to the thick coil S of the first transformer.

We call a strip in which part of the twist is right-handed and part left-handed a double twisted strip.

We claim—

1. The combination with the supports, of a strained right and left twisted strip, and a pointer connected therewith, substantially as described.

2. The combination with the supports, of a strained right and left twisted strip secured at both ends to the supports and held under tension, a pointer secured to the strip at its central portion, and a dial arranged in juxtaposition to the pointer substantially as specified.

3. The combination with the supports mounted in a tubular casing, of a twisted strip, part of which has a right hand twist, and part a left hand twist fixed in said supports and held under tension, and a pointer secured to the strip between the right and left hand twist, substantially as specified.

4. The combination with the tubular case arranged to compensate for changes of temperature, and supports mounted in the case, a strained right and left twisted strip secured in said supports under tension, and a pointer connected therewith, substantially as described.

5. The combination with the portion D of the tubular casing of means for fastening the end A of the twisted strip consisting of the slotted screw piece J projection K movable cap M projection N slotted nut L and spring O substantially as specified.

6. The combination with the portion F of the tubular casing of the insulated metallic block H to which the end C of the twisted strip and the wire Z are fastened substantially as specified.

7. The combination with the twisted strip and its index finger of a tubular casing covering in the strip and a circular casing covering the index finger in all its movements and containing the graduated scale plate.

8. The combination with the twisted strip A B C of an extra resistance R' for the purpose of enabling the strip to be used as a high reading voltmeter.

9. The combination with twisted strip A B C of a conductor or resistance R" connected in parallel with the strip so that a portion of the current passes through each thus enabling the strip to be employed as a high reading ammeter.

10. The combination with the twisted strip A B C of a transformer Q S substantially as described for measuring alternating currents.

In testimony whereof we have hereto set our hands in the presence of the two subscribing witnesses.

WILLIAM EDWARD AYRTON.
JOHN PERRY.

Witnesses to signature of William Edward Ayrton:
A. D. RAINE,
CHARLES EDWARD HOLLAND.

Witnesses to signature of John Perry:
NOEL C. JONES,
G. F. WARREN.